United States Patent
Campbell

(10) Patent No.: US 6,301,648 B1
(45) Date of Patent: Oct. 9, 2001

(54) METHOD AND APPARATUS FOR PROCESSING MEMORY ACCESSES UTILIZING A TLB

(75) Inventor: Paul W. Campbell, Oakland, CA (US)

(73) Assignee: ATI International Srl, Christ Church (BB)

(*) Notice: Subject to any disclaimer, the term of this patent is extended or adjusted under 35 U.S.C. 154(b) by 0 days.

(21) Appl. No.: 09/376,824

(22) Filed: Aug. 18, 1999

(51) Int. Cl.[7] ................................................. G06F 12/10
(52) U.S. Cl. ................................................. 711/207; 712/244
(58) Field of Search ................................. 711/202, 203, 711/207, 137; 712/244, 207

(56) References Cited

U.S. PATENT DOCUMENTS

| | | | |
|---|---|---|---|
| 5,852,738 | * 12/1998 | Beakowski et al. | 712/1 |
| 5,918,251 | * 6/1999 | Yamada et al. | 711/207 |
| 6,092,172 | * 7/2000 | Nishimoto et al. | 711/207 |
| 6,138,226 | * 10/2000 | Yoshioka et al. | 711/210 |

* cited by examiner

Primary Examiner—Hiep T. Nguyen
Assistant Examiner—Jasmine Song
(74) Attorney, Agent, or Firm—Vedder, Price, Kaufman & Kammholz

(57) ABSTRACT

A method and apparatus for processing memory access requests having enhanced functionality includes processing that begins by receiving a memory access request. The process continues by determining whether the memory access request triggers an address caching process to be performed. If so, the address caching process is performed. While performing the address caching process, a determination is made as to whether the address caching processing triggers an exception process to be performed based upon a physical address derived from the address caching process. Such address space requiring further processing includes video graphics address space, restricted memory space, read-only memory space, non-cacheable data memory space, device emulation exceptions memory space, and memory exceptions. When the exception process is triggered during the address caching process, the exception process is performed and the results are cached in an address processing cache.

27 Claims, 5 Drawing Sheets

| | | | TLB 38 or 42 | | |
|---|---|---|---|---|---|
| valid bit | dirty bit | virtual addr sp | msb of virt addr | msb phys addr | exception |
| 1 | 0 | vas1 | msb1 | msb1 | none |
| 1 | 1 | vas2 | msb2 | msb2 | restricted memory |
| 1 | 1 | vas3 | msb3 | msb3 | non-cacheable data |
| 0 | 0 | vas4 | msb4 | msb4 | VGA emulation |
| 1 | 1 | vas5 | msb5 | msb5 | video graphics |
| 1 | 0 | vas6 | msb6 | msb6 | redefine address space |

FIG. 7

| physical address space | |
|---|---|
| address range | memory type |
| aa - bb | main memory |
| cc - dd | video graphics |
| ee - ff | PCI |
| gg - hh | restricted memory |
| ii - jj | non-cacheable data |
| kk - ll | device emulation (VGA) exception |
| mm - nn | redefine address space exception |

FIG. 6

METHOD AND APPARATUS FOR PROCESSING MEMORY ACCESSES UTILIZING A TLB

TECHNICAL FIELD OF THE INVENTION

This invention relates generally to computer system architectures and more particularly to memory access processes utilizing a translation look aside table (TLB).

BACKGROUND OF THE INVENTION

FIG. 1 illustrates a schematic block diagram of a portion of a computing system. The computing system includes a central processing unit, cache memory, a memory manager (e.g., a chipset), and memory. The CPU is shown to include a processor and a translation look aside table ("TLB"). The system of FIG. 1 further illustrates cache hardware that interfaces with the cache memory. Typically, the cache hardware is included in the central processing unit.

Referring to FIGS. 1 and 2 simultaneously, the numbers included in parentheticals of FIG. 1 correspond to processing steps of FIG. 2. FIG. 2 illustrates a logic diagram of a read memory access request. The read memory access request begins when the processor generates a linear address (1). As is known, the central processing unit utilizes linear addressing, or virtual addressing, to internally process memory access requests. The memory, however, stores data utilizing physical addresses, thus the linear addresses need to be translated to physical addresses for the memory.

Having generated the linear address, the central processing unit determines whether a TLB entry exists for the linear address (2). If page translation techniques are used, a TLB entry will typically include a valid indicator, a dirty bit indicator, a page directory entry, a page table entry, and the most significant bits of the physical address. These entries are derived from the linear address utilizing known paging techniques, which essentially use a first portion of the linear address to obtain the page directory entry and a second portion of the linear address along with the page directory entry to obtain the page table entry. Such paging techniques then take the page table entry, the page directory entry, and the most significant bits of the physical address to create the physical address.

If a TLB entry does not exist, the central processing unit creates a TLB entry (3). Having generated a TLB entry, the central processing unit then repeats step 2 by determining whether a TLB entry exists for the linear address. Having just created one, the inquiry at step 2 is positive, thus the process proceeds to step 4. At step 4, the physical address is obtained from the TLB entry and used to determine whether the corresponding data is cached, which is done at step 5. If so, the cache hardware causes the data to be retrieved from the cache, which is shown at step 6. If, however, the data is not cached, the physical address is provided to the memory manager. The memory manager interprets the physical address to determine whether the physical address corresponds to a location in the memory, requires an AGP translation, or is within the PCI memory space. If the physical address is within the PCI memory space, the request is provided to the PCI bus. If the physical address is in the AGP memory space, an AGP translation is performed to obtain a corresponding physical address within the memory.

When the physical address identifies a location within the memory, the memory manager retrieves the data from the identified location, which occurs at step 8. Typically, the memory manager retrieves a full line of data (e.g., 32 bits, 64 bits, 128 bits). The memory manager then coordinates sending the data, at step 10, to the processor. In addition, a determination is made by the cache hardware at step 9 as to whether the data is to be cached. If not, the process is complete for this read memory access request. If, however, the data is to be cached, the process proceeds to step 11 where the data is cached.

A write memory access request is processed in a similar manner as the described read memory access request, however, the data flow is in the opposite direction. In addition, write requests may write to the cache memory and then subsequently flush to main memory.

While the system of FIG. 1 performs the memory access request as illustrated in FIG. 2, the processing of memory access request is quite limiting. For instance, the further translations to AGP memory space is done externally to the central processing unit thus adding extra processing steps and memory requirements, since the memory manager includes its own TLB for performing the AGP translations. In addition, other memory access options, such as restricted memory, cache enabled/disabled, read-only memory, device emulation, and redefining address space require separate and additional processing.

Therefore, a need exists for a method and apparatus of enhancing memory access requests to perform a plurality of related memory access functions in addition to the basic memory access functions.

BRIEF DESCRIPTION OF THE DRAWING

FIG. 6 illustrates a physical address space table in accordance with the present invention; and FIG. 7 illustrates a translation look aside table in accordance with the present invention.

DETAILED DESCRIPTION OF A PREFERRED EMBODIMENT

Generally, the present invention provides a method and apparatus for processing memory access requests having enhanced functionality. Such processing begins by receiving a memory access request. The process continues by determining whether the memory access request triggers an address caching process (e.g., TLB entry generation process) to be performed. If so, the address caching process is performed. While performing the address caching process, a determination is made as to whether the address caching processing triggers an exception process to be performed based upon a physical address derived from the address caching process. In other words, a determination is made as to whether the physical address derived from the address caching process is addressing address space that requires further processing. Such address space requiring further processing includes video graphics address space, accelerated graphics port (AGP) address space, restricted memory space, read-only memory space, non-cacheable data memory space, device emulation exceptions memory space, and memory exceptions. When the exception process is triggered during the address caching process, the exception process is performed and the results are cached in an address processing cache (e.g., a TLB). With such a method and apparatus, further memory access functionality may be performed by the central processing unit while processing memory access requests, which enhances the overall efficiency of the computing system because additional hardware and additional processing steps are not required in either the memory manager or peripheral devices.

Figure 1:
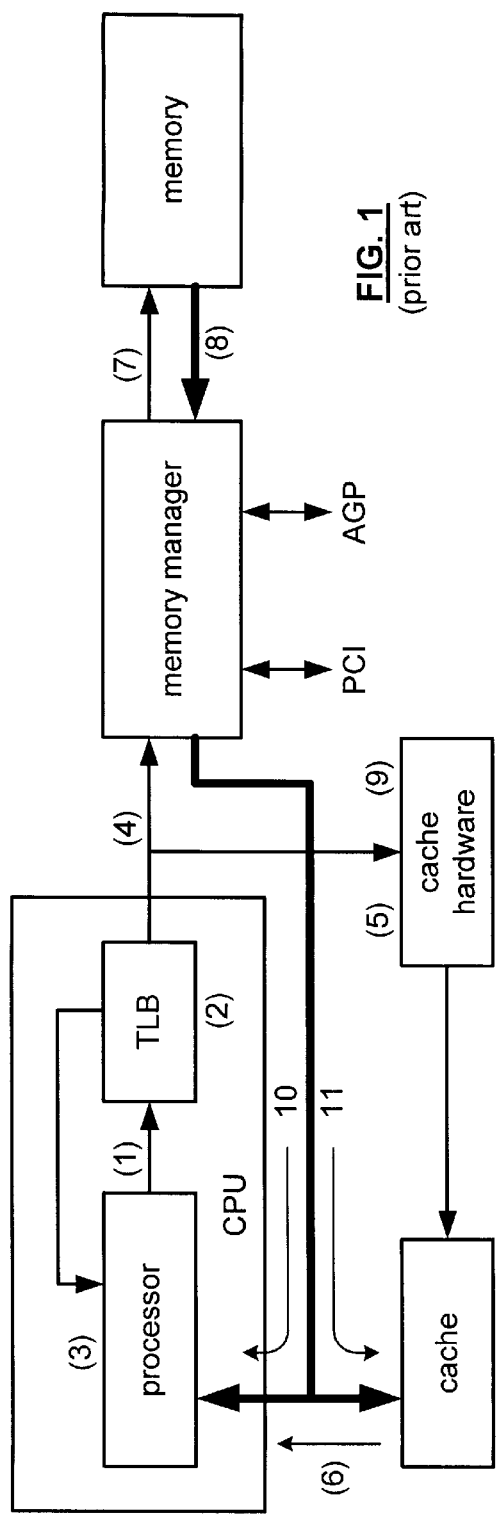
FIG. 1 illustrates a schematic block diagram of a prior art computing system.
Figure 2:
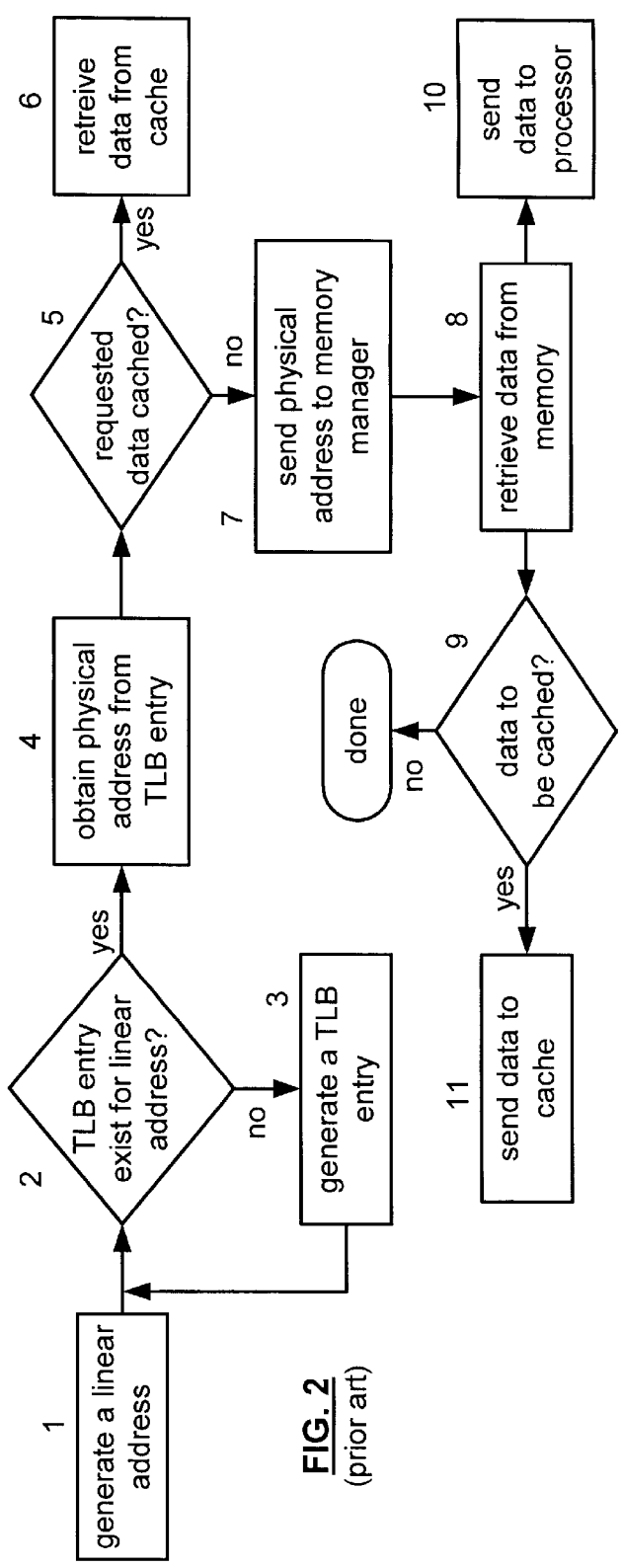
FIG. 2 illustrates a prior art logic diagram of a method for a read memory access request.
Figure 3:
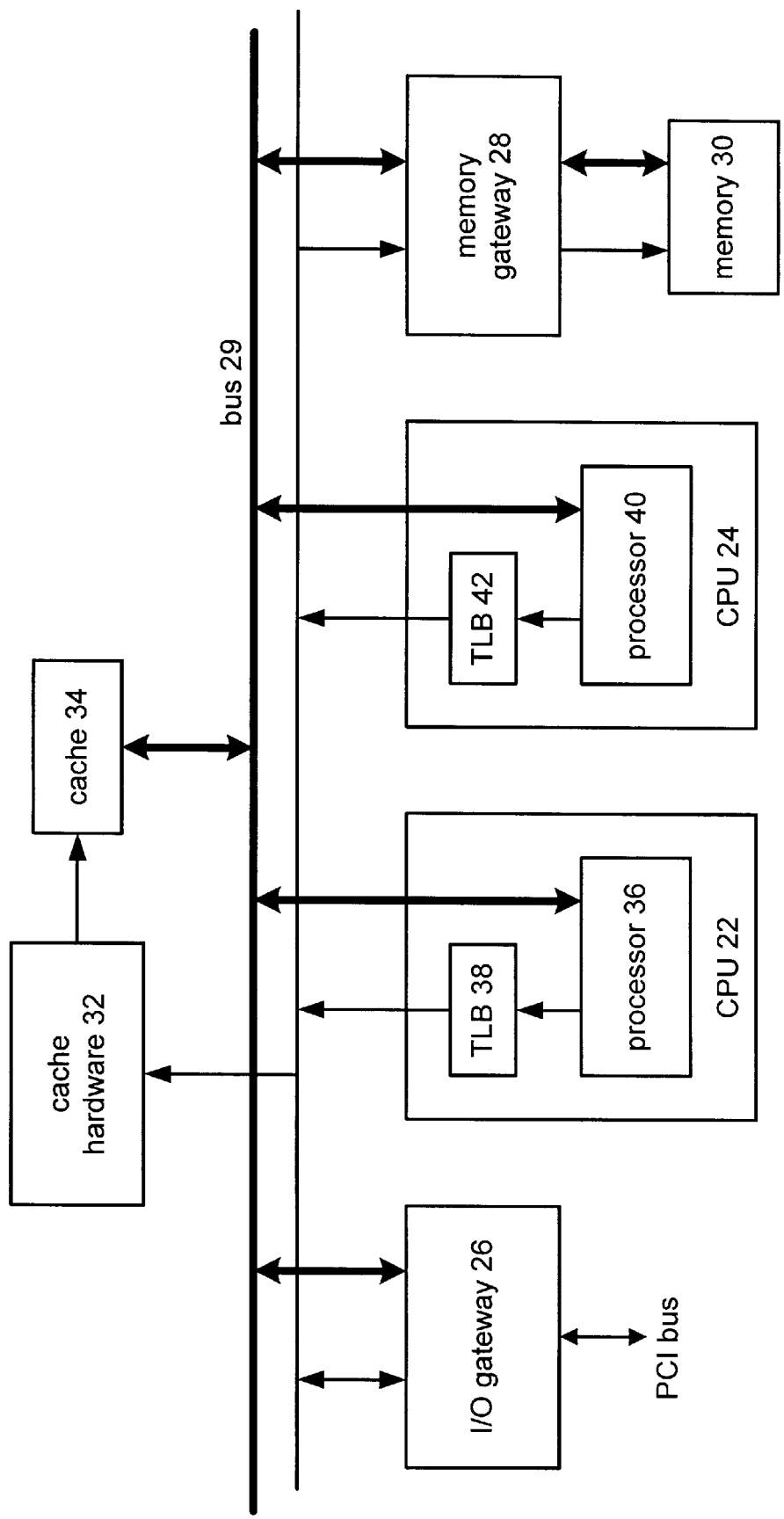
FIG. 3 illustrates a schematic block diagram of a computing system that implements memory access requests in accordance with the present invention.

The present invention can be more fully described with reference to FIGS. 3 through 7. FIG. 3 illustrates a schematic block diagram of a computing system 20 that includes multiple central processing units 22 and 24, an input/output gateway 26, a memory gateway 28, a high speed bus 29, cache hardware 32, and a cache 34. The I/O gateway 26 provides an interface between a PCI bus within the computing system and the high speed bus 29. Details of the I/O gateway 26 may be obtained by referring to co-pending patent application having a title of METHOD AND APPARATUS FOR INTERFACING A BUS WITH INPUT/OUTPUT DEVICES, a serial number of "not assigned", and a filing date being the same as the filing date as the present application. Such co-pending patent application is assigned to the same assignee as the present application.

Each of the central processing units 22 and 24 include a processor 36 and 40 and a translation look aside table (TLB) 38 and 42. The processors 36 and 40 may be general purpose processors (e.g., x86 processor) or dedicated purpose processors (e.g., a video graphics controller). The details of the architecture of the central processing units 22 and 24 may be obtained by referring to co-pending patent application entitled "TDB" having an attorney docket number of TDB, a filing date of TDB, a serial number of TDB and is assigned to the same assignee as the present invention.

The memory gateway 28 provides an interface between the memory 30, which constitutes the system memory, and the bus 29. In general, the memory gateway 28 functions as a high-speed to low-speed data converter. Generally, the accessing speed of memory 30 is considerably slower than the speed at which data is transported on the bus 29. For example, the bus 29 may have a bandwidth, or cache line, of 256 bits, and the data is transported synchronously at a rate of 500 megahertz. The memory, however, is accessed in a different manner and operates at a lower speed than 500 megahertz. For a more detailed discussion of the memory gateway 28 refer to co-pending patent application entitled METHOD AND APPARATUS FOR INTERFACING MEMORY WITH A BUS, a filing date being the same as the filing date for the present application, serial number of "not assigned" and is assigned to the same assignee as the present invention.

The bus 29 facilitates memory access requests between the components coupled thereto using the physical address space. As such, the central processing units 22 and 24 convert linear addresses to physical addresses via the TLBs for conveyance of memory access request transactions on to the bus 29. In addition, the central processing units 22 and 24, using a corresponding entry in the TLBs 38 and 42, identifies, within the transaction, the particular component that is to receive the memory access transaction. The I/O gateway 26, the memory gateway 28 and the cache hardware 22 monitor the address portion of a memory access transaction on the bus 29 to determine whether the transaction is identifying it. For example, if a TLB entry indicates that the requested data is cached, the central processing unit 22 or 24 identifies, within the corresponding memory access request, the cache hardware, such that the cache hardware 32 processes the request. As one of average skill in the art will appreciate, the cache hardware 32, which is shown as a separate entity, may be included in the central processing unit 22 and/or 24.

By caching additional parameters in the CPU's TLB 38 or 42, additional memory access functions may be processed by the CPU. For example, the additional memory access functions includes, but is not limited to, performing video graphic address translations, identifying restricted memory locations, determining whether retrieved data is cacheable, determining whether data requests are read-only, and performing device emulations such as VGA emulations and/or redefining the address space. To perform the memory access requests with further functionality, the central processing units 22 and 24 perform the processes shown in FIGS. 4 and 5 and include the tables shown in FIGS. 6 and 7.

Figure 4:
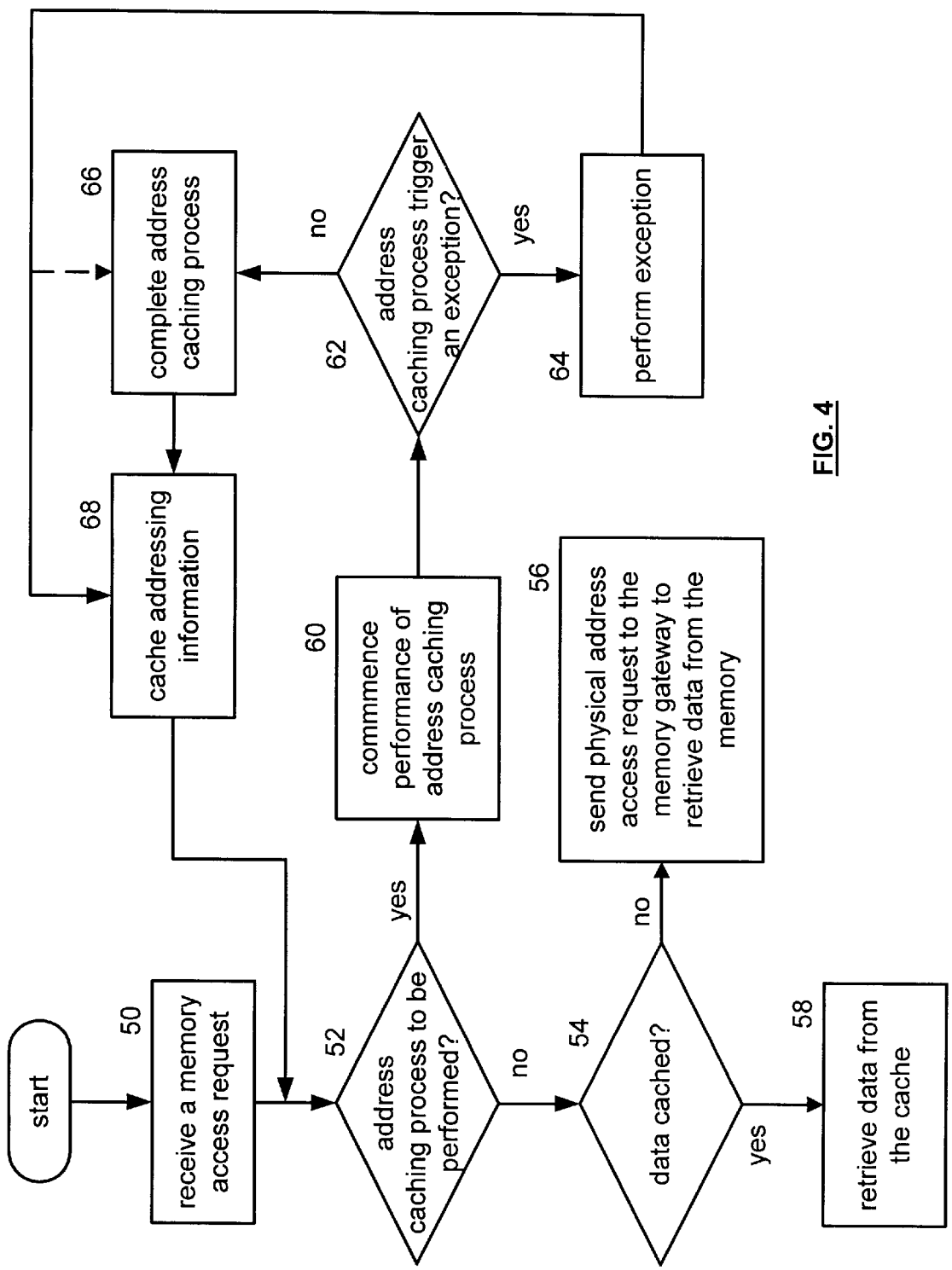
FIG. 4 illustrates a logic diagram of a method for processing memory access requests in accordance with the present invention.

FIG. 4 illustrates a logic diagram of a method for processing memory access requests with enhanced functionality. The process begins at step 50 where a memory access request is received. Such a memory access request may be a read access request, a write access request, or a combination thereof. The process then proceeds to step 52 where a determination is made as to whether an address caching process needs to be performed. As previously mentioned, the processors 36 and 40 utilize a linear addressing space which needs to be converted to physical addressing space before it can be placed on bus 29. One such address caching process is paging, which uses a translation look aside table. However, other address conversion techniques may be utilized such as direct mapping, tile mapping, etc.

If an address caching process does not need to be performed, the process proceeds to step 54 where a determination is made as to whether the data is cached. If so, the data is retrieved from the cache at step 58.

If, however, the data is not cached, the process proceeds to step 56 where, for certain memory access requests, a physical address is sent to the memory gateway such that the corresponding data can be retrieved from memory. As such, when the corresponding memory translation has been retrieved from the address cache, a determination is made as to whether any special processing is to be performed or restrictions are to be enforced related to this particular memory access request. For general memory access requests, no such restrictions apply such that the physical address will be provided to the memory gateway without restriction of retrieval or subsequent utilization of the data. However, when further functioning is to be performed, the central processing unit utilizes entries within the translation look aside table to determine which further functions are to be performed. For example, if the physical address corresponds to restricted addressing space, the central processing unit determines whether the restricted memory can be accessed. In one application, the restricted memory can only be accessed when the central processing unit is performing a native processing function. Such utilization of restricted memory space is described in co-pending patent application entitled METHOD AND APPARATUS FOR RESTRICTING MEMORY ACCESS, a filing date of Jun. 9, 1999, a Ser. No. of 09/328,333 and is assigned to the same assignee as the present invention.

If the further functionality indicates that the central processing unit is retrieving memory for VGA emulation, the central processing unit, or processor, emulates the video graphics adapter (VGA) function or provides data to an exception handler, which emulates the VGA function. As such, a separate VGA card is not needed. In addition, if the further processing indicates that the data is read-only (e.g., read data from a texture map for video graphics processing), the processor will use the data but will not generate a write request for manipulated data. Additionaly, if the further functioning relates to caching or non-caching of the data, the processing unit will perform accordingly. As such, the processing unit does not rely on other components in the computer system to determine how it can utilize data obtained from particular memory access requests. As in prior art systems, when the processing unit relied on other devices, the system operated in a less than optimal manner since the central processing unit took a passive approach to processing data that may have restrictions thereon. By taking an active approach, as is the case in the present invention, the central processing unit is more efficient at processing memory access requests and is able to provide further memory access functionality.

Returning to the flow of FIG. 4, if an address caching process is to be performed, the process proceeds to step 60 where the performance of the address caching process is commenced. While performing the address caching process, the process proceeds to step 62 where a determination is made as to whether the process triggers an exception. If not, the address caching process is complete at step 66 and the address access information (e.g., TLB entry) is cached at step 68.

If, however, an exception is triggered during the address caching process, the exception is performed at step 64. The exceptions include read-only memory, video graphics address translations, PCI memory, restricted memory, non-cacheable data, device emulation exception (e.g., VGA emulation), redefining the address space exception. By performing these exceptions, the corresponding exception is identified within the translation look aside table such that when the central processing unit accesses the corresponding TLB entry, it knows the processing limitations and/or further processing required for this particular memory access request. Such further functionality was not available to the central processing unit in prior computing systems.

Having cached the addressing information, which may include the exception information, the processing repeats at step 52 to determine whether the address caching process needs to be performed. Since the address caching process has just been performed the answer to step 52 is no. As such, the newly generated addressing information is retrieved and utilized to respond to the current memory access requests, via steps 54 through 58.

Figure 5:
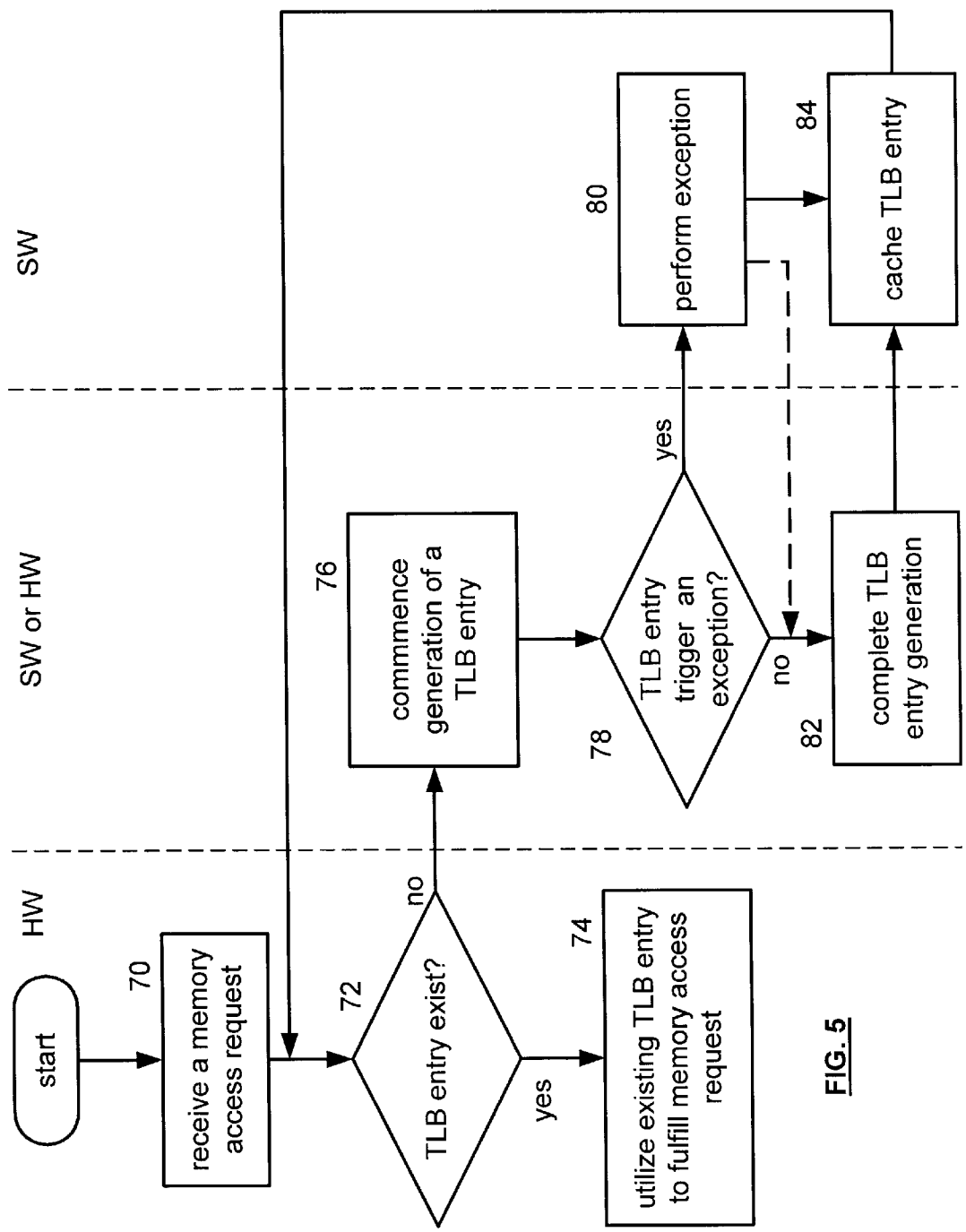
FIG. 5 illustrates a logic diagram of an alternate method of processing memory access requests in accordance with the present invention.

FIG. 5 illustrates a logic diagram of another method for processing memory access requests having further functionality. The process is divided into three sections wherein the first section, which includes 70 through 74 may be performed in hardware, the second section, which includes step 76, 78 and 82 may be performed in software or hardware, and the third section which includes steps 80 and 84 are performed in software. The process begins at step 70 where a memory access request is received. The process then proceeds to step 72 where a determination is made as to whether a TLB entry exists. If so, the process proceeds to step 74 where the existing TLB entry is utilized to fulfill the memory access request. The fulfillment of the memory access requests is similar to step 56 of FIG. 4 and thus will not be discussed in great detail.

If a TLB entry does not exist, the process proceeds to step 76 where generation of a TLB entry is commenced. In general, a TLB entry describes a virtual address to a physical address translation. The process then proceeds to step 78 where a determination is made as to whether the TLB entry triggers an exception. Such a determination may be based on determining whether the physical address obtained from the virtual to physical address translation is within an exception address range of at least one exception address ranges. In other words, does the physical address fall within address spaces that require further functions (e.g., video graphics address space, read-only memory address space, non-cacheable data memory space, device emulation address space or redefining the address space) to be performed. If not, the process proceeds to step 82 where the TLB entry generation is completed by caching the TLB entry at step 84. The process then repeats at step 72 to utilize the newly created TLB entry to fulfill the memory access request.

If, however, the TLB entry triggers an exception, the process proceeds to step 80. At step 80, the exception is performed with respect to generating TLB entries for the special function memory access request. For example, the exception process may include restricting access to reserve memory locations, performing further address translations (e.g., AGP address translations), changing data caching attributes (e.g., enabling caching of data, disabling caching of data), emulating hardware devices (e.g., VGA processing, BIOS processing), switching between address spaces (e.g., from PCI memory space to main memory space and vice-versa), or creating an alternate TLB entry that differs from the present TLB entry (e.g., to redefine address space). In addition, the performance of the exception may be to emulate the memory access request.

Having performed the exception, the process proceeds to step 84 where the TLB entry is stored along with information regarding the processing of the exception. The process then repeats at step 72 such that the newly-created TLB entry can be utilized to fulfill the memory access request.

FIG. 6 illustrates a physical address space table. The table includes an address range and corresponding memory type. In this example, address range AA to BB corresponds to main memory. Typically access to the main memory will have no restrictions on processing such that read and write memory requests thereto will be performed normally. An exception may occur if a particular location within the main memory is flagged as read-only memory. In such a case, the TLB entry would include an exception field indicating that the corresponding memory location is a read-only location.

The memory types further include video graphics memory, which typically corresponds to AGP memory space, PCI memory, restrictive memory, non-cacheable data memory space, device emulation exception memory space, and redefined address space exception memory space. Each of these memory types will have a corresponding address range such that if the physical address derived by the normal TLB process falls within this range, the corresponding exception will be processed. For example, if a physical address falls within the CC to DD address range, the video graphics processing will be performed. In this case, the address will undergo a further translation to point to the video graphics addressing space. This is further described in co-pending patent entitled METHOD AND APPARATUS FOR VIRTUAL ADDRESS TRANSLATION, filing date of Jul. 14, 1999, a Ser. No. of 09/352,959 and is assigned to the same assignee as the present invention.

If the physical address retrieved from the normal TLB processing falls within the GG to HH space, the physical address is addressing restrictive memory. In the co-pending patent application previously mentioned, restrictive memory is used by the central processing units to perform native-type functions. As such, the TLB entry would include a restriction indication under the exceptions for such physical addresses, such that the processing unit by accessing its TLB can determine whether it is in the proper mode to access such memory locations.

FIG. 7 illustrates the translation look aside tables 38 or 42. As shown, the translation look aside table includes a valid bit field, a dirty bit field, a virtual address space field, MSB of virtual address field, a most significant bits of the physical address field, and an exception field. As one of average skill in the art would appreciate the TLB may include further fields for address translations. The validity bit is used to indicate whether the current entry is valid. As such a "1" indicates valid and a "0" indicates invalid. The dirty bit indicates whether the data associated with the memory access request has been altered and has not been written back to main memory, i.e., needs to be flushed. A "0" indicates that the data has not been changed and a "1" indicates that the data has been altered and requires a flush to main memory. The most significant bits of the physical address are derived from a portion of the linear address such that in combination with the virtual address space data and the MSB of virtual address data the actual physical address is obtained.

The exception field indicates for a particular entry whether an exception is to be applied. As shown for the first entry, no exceptions are to be applied such that memory access requests are processed normally. The second entry indicates a restricted memory exception. The third entry indicates a non-cacheable data exception such that data retrieved from memory access request, or data associated with a write command, would not be cached. The other entries have corresponding exceptions that are processed as previously discussed. Note that the redefined address space exception indicates that the physical address space as shown in FIG. 6 may be redefined. As such, the address ranges may be altered, i.e., expanded or contracted and a particular memory type may be added or deleted.

The preceding discussion has presented a method and apparatus for processing memory access requests with further functionality. By allowing the central processing unit to cache within its TLB further processing requirements, the central processing unit more efficiently and effectively processes memory access requests. As one of average skill in the art would appreciate other embodiments may be derived from the teachings of the present invention without deviating from the scope of the claims or the spirit of the invention.

What is claimed is:

1. A method for processing memory accesses, the method comprises the steps of:
    a) receiving a memory access request;
    b) determining whether the memory access request triggers an address caching process to be performed;
    c) when the memory access requests triggers the address caching process to be performed, commencing performance of the address caching process;
    d) determining whether the address caching process triggers an exception process utilizing entries within a TLB to be performed based upon a physical address derived from the memory access request; and
    e) when the address caching process triggers an exception process to be performed, performing the exception process.

2. The method of claim 1, wherein step (b) further comprises:
    performing a translation look aside table (TLB) look up; and
    when a corresponding TLB entry does not exist in the TLB, translating a virtual address identified in the memory access request into the physical address.

3. The method of claim 2, wherein step (c) further comprises:
    generating the TLB entry to describe the virtual address to a physical address translation; and storing the TLB entry in the TLB.

4. The method of claim 3, wherein step (d) further comprises determining whether the physical address is within an exception address range of at least one exception address ranges.

5. The method of claim 4 further comprises:
    changing the exception address range; and
    clearing the TLB when the exception address range is changed.

6. The method of claim 3, wherein the exception process further comprises at least one of: restricting access to reserved memory locations, performing further address translations, changing data caching attributes, emulating hardware devices, switching between address spaces, creating an altered TLB entry that differs from the TLB entry.

7. The method of claim 6 further comprises caching the altered TLB entry.

8. The method of claim 1, wherein step (e) further comprises emulating, as the exception process, the memory access request.

9. A method for processing memory accesses, the method comprises the steps of:
    a) receiving a memory access request;
    b) determining whether a translation look aside table (TLB) entry exists for memory locations identified by the memory access;
    c) when the TLB entry does not exist, commencing generation of the TLB entry;
    d) determining whether the generating of the TLB entry triggers an exception process to be performed based upon a physical address derived from the memory access request; and
    e) when the generating of the TLB entry triggers an exception process to be performed, performing the exception process.

10. The method of claim 9, wherein step (c) further comprises:
    generating the TLB entry to describe the virtual address to a physical address translation; and
    caching the TLB entry in the TLB.

11. The method of claim 10, wherein step (d) further comprises determining whether the physical address is within an exception address range of at least one exception address ranges.

12. The method of claim 11 further comprises:
    changing the exception address range; and clearing the TLB when the exception address range is changed.

13. The method of claim 10, wherein the exception process further comprises at least one of: restricting access to reserved memory locations, performing further address translations, changing data caching attributes, emulating hardware devices, switching between address spaces, creating an altered TLB entry that differs from the TLB entry.

14. The method of claim 9, wherein step (e) further comprises emulating, as the exception process, the memory access request.

15. A memory access processing module comprises:

a processing device; and memory operably coupled to the processing device, wherein the memory stores operational instructions that cause the processing device to: (a) receive a memory access request; (b) determine whether the memory access request triggers an address caching process to be performed; (c) commence performance of the address caching process when the memory access requests triggers the address caching process to be performed; (d) determine whether the address caching process triggers an exception process utilizing entries within a TLB to be performed based upon a physical address derived from the memory access request; and (e) perform the exception when the address caching process triggers an exception process to be performed.

16. The memory access processing module of claim 15, wherein the memory further comprises operational instructions that cause the processing device to determine whether the memory access request triggers the address caching process by:

performing a translation look aside table (TLB) look up; and when a corresponding TLB entry does not exist in the TLB, translating a virtual address identified in the memory access request into the physical address.

17. The memory access processing module of claim 16, wherein the memory further comprises operational instructions that cause the processing device to:

generate the TLB entry to describe the virtual address to a physical address translation; and store the TLB entry in the TLB.

18. The memory access processing module of claim 16, wherein the memory further comprises operational instructions that cause the processing device to determine whether the physical address is within an exception address range of at least one exception address ranges.

19. The memory access processing module of claim 18, wherein the memory further comprises operational instructions that cause the processing device to:

change the exception address range; and clear the TLB when the exception address range is changed.

20. The memory access processing module of claim 16, wherein the exception process further comprises at least one of: restricting access to reserved memory locations, performing further address translations, changing data caching attributes, emulating hardware devices, switching between address spaces, creating an altered TLB entry that differs from the TLB entry.

21. The memory access processing module of claim 15, wherein the memory further comprises operational instructions that cause the processing device to emulate, as the exception process, the memory access request.

22. A memory access processing module comprises:

a processing device; and memory operably coupled to the processing device, wherein the memory stores operational instructions that cause the processing device to: (a) receive a memory access request; (b) determine whether a translation look aside table (TLB) entry exists for memory locations identified by the memory access; (c) commence generation of the TLB entry when the TLB entry does not exist; (d) determine whether the generating of the TLB entry triggers an exception process utilizing entries within a TLB to be performed based upon a physical address derived from the memory access request; and (e) perform the exception process when the generating of the TLB entry triggers an exception process to be performed.

23. The memory access processing module of claim 21, wherein the memory further comprises operational instructions that cause the processing device to:

generate the TLB entry to describe the virtual address to a physical address translation; and cache the TLB entry in the TLB.

24. The memory access processing module of claim 22, wherein the memory further comprises operational instructions that cause the processing device to determine whether the physical address is within an exception address range of at least one exception address ranges.

25. The memory access processing module of claim 23, wherein the memory further comprises operational instructions that cause the processing device to:

change the exception address range; and clear the TLB when the exception address range is changed.

26. The memory access processing module of claim 21, wherein the exception process further comprises at least one of: restricting access to reserved memory locations, performing further address translations, changing data caching attributes, emulating hardware devices, switching between address spaces, creating an altered TLB entry that differs from the TLB entry.

27. The memory access processing module of claim 21, wherein the memory further comprises operational instructions that cause the processing device to emulate, as the exception process, the memory access request.

* * * * *